(12) United States Patent
Nagao et al.

(10) Patent No.: US 10,673,635 B2
(45) Date of Patent: Jun. 2, 2020

(54) DATA MANAGEMENT SYSTEMS AND METHODS

(71) Applicant: Intertrust Technologies Corporation, Sunnyvale, CA (US)

(72) Inventors: Yutaka Nagao, Cupertino, CA (US); Sanjiv Jha, Bangalore (IN); Michael Tamir, Alameda, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 0 days.

(21) Appl. No.: 16/538,419

(22) Filed: Aug. 12, 2019

(65) Prior Publication Data

US 2020/0084043 A1 Mar. 12, 2020

Related U.S. Application Data

(63) Continuation of application No. 15/495,328, filed on Apr. 24, 2017, now Pat. No. 10,411,899.

(Continued)

(51) Int. Cl.
| | |
|---|---|
| *H04L 9/32* | (2006.01) |
| *H04L 29/06* | (2006.01) |
| *F03D 7/04* | (2006.01) |
| *G06F 21/44* | (2013.01) |
| *G06N 20/00* | (2019.01) |

(52) U.S. Cl.
CPC ............ *H04L 9/3247* (2013.01); *F03D 7/046* (2013.01); *F03D 7/048* (2013.01); *G06F 21/44* (2013.01); *H04L 63/0428* (2013.01); *H04L 63/0823* (2013.01); *H04L 63/10* (2013.01); *H04L 63/123* (2013.01); *H04L 63/126* (2013.01); *G06N 20/00* (2019.01); *Y04S 40/24* (2013.01)

(58) Field of Classification Search
CPC ... H04L 9/3247; H04L 63/0823; H04L 63/10; H04L 63/126; H04L 63/123; H04L 63/0428; F03D 7/046; F03D 7/048; G06F 21/44; G06N 20/00; Y04S 40/24
See application file for complete search history.

(56) References Cited

U.S. PATENT DOCUMENTS

| | | | | |
|---|---|---|---|---|
| 2004/0122921 A1* | 6/2004 | Dausch | .................. | G07C 5/008 709/223 |
| 2013/0263289 A1* | 10/2013 | Vijayan | .................. | H04L 67/22 726/31 |

(Continued)

OTHER PUBLICATIONS

Dhungana et al.; "Aspern Smart ICT: Data Analytics and Privacy Challenges in a Smart City", 2015, IEEE, pp. 1-6. (Year: 2015).*

*Primary Examiner* — Matthew Smithers
(74) *Attorney, Agent, or Firm* — Finnegan, Henderson, Farabow, Garrett & Dunner, LLP

(57) ABSTRACT

This disclosure related to systems and methods that facilitate the secure collection and management of operational data relating to a power generation system that includes one or more wind turbines. Embodiments disclosed herein may also be used to provide various insights on wind farm operation and management using collected operational data. Further embodiments facilitate policy-managed access to operational data, including policy-managed access implementing differential privacy, in a manner allowed and/or otherwise controlled by parties having ownership rights or interests in the data.

18 Claims, 11 Drawing Sheets

Related U.S. Application Data

(60) Provisional application No. 62/396,436, filed on Sep. 19, 2016, provisional application No. 62/327,315, filed on Apr. 25, 2016.

(56) References Cited

U.S. PATENT DOCUMENTS

| | | | | |
|---|---|---|---|---|
| 2013/0345884 A1* | 12/2013 | Forbes, Jr. | ............ | G05B 15/02 |
| | | | | 700/286 |
| 2014/0123307 A1* | 5/2014 | Jung | ................... | H04L 41/5054 |
| | | | | 726/27 |
| 2014/0266682 A1* | 9/2014 | Gettings | ................ | G08B 23/00 |
| | | | | 340/517 |
| 2014/0351285 A1* | 11/2014 | Liu | ........................ | G06Q 50/06 |
| | | | | 707/770 |
| 2016/0333855 A1* | 11/2016 | Lund | ........................ | F03D 7/048 |
| 2016/0365729 A1* | 12/2016 | Pochana | ............. | G05B 13/021 |

\* cited by examiner

| Dataset | Dataset Description |
|---|---|
| Numerical Weather Prediction Data | Numerical weather prediction module data, physical model data (e.g., Weather Research and Forecasting ("WRF") Model), model data generated and/or maintained to forecast atmospheric parameters |
| Historic Wind Data | Historic wind data (e.g., windspeed, direction, etc.) generated by one or more anemometers associated with various locations and/or wind turbines |
| Anemometer Data | Current wind data (e.g., windspeed, direction, etc.) generated by one or more anemometers associated with various locations and/or wind turbines |
| Rated Power Curve | Data associated with the rated power of turbine(s) relative to wind speed |
| Real-time Power Generation Data | Real-time information associated with power generated by wind turbine(s) |
| Failure Log Data | Failure events of various wind turbine(s) and/or other system components |
| Turbine Sensor Data | Data provided by various wind turbine sensors |
| Change Data Log | Operational data reflecting various control parameter of wind turbine(s) and/or control parameter changes associated with the same |
| Maintenance Log | Maintenance log and/or outage information associated with wind turbine(s) |
| Alarm Information | Detailed alarm status information |
| Alarm Status | Status of various system alarms |

Figure 2

DATA MANAGEMENT SYSTEMS AND METHODS

RELATED APPLICATIONS

This application is a continuation of U.S. application Ser. No. 15/495,328, filed Apr. 24, 2017, and entitled "DATA MANAGEMENT SYSTEMS AND METHODS," which claims benefit of priority under 35 U.S.C. § 119(e) to U.S. Provisional Application No. 62/327,315, filed Apr. 25, 2016, and entitled "DATA MANAGEMENT SYSTEMS AND METHODS," and U.S. Provisional Application No. 62/396,436, filed Sep. 19, 2016, and entitled "DATA MANAGEMENT SYSTEMS AND METHODS," all of which are hereby incorporated by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to the communication, storage, and management of data. More specifically, but not exclusively, the present disclosure relates to systems and methods for communication, storage, and management of data associated with wind turbine power generation systems.

Arrays of wind turbines, known as wind farms, are becoming an increasingly important source of clean renewable energy. A variety of data may be produced and/or otherwise used in connection with the operation of a wind farm, which may be generally described herein as operational data. Operational data may include, without limitation, data obtained from one or more sensors associated with wind turbines (e.g., wind speed information, turbine speed information, mechanical stress and/or load information, power output information, and/or the like), supervisory control and data acquisition ("SCADA") data, current and/or forecasted weather and/or operating condition data (e.g., current and/or forecasted power grid demands, etc.), and/or the like.

Embodiments of the disclosed systems and methods may be used in connection with the communication, storage, and management of operational data associated with a power generation system that includes one or more wind turbines. Among other things, embodiments of the disclosed systems and methods may facilitate secure collection and management of operational data relating to a wind farm and provide insights on wind farm operation and management.

Embodiments of the disclosed systems and methods may further facilitate policy-managed access to operational data by other parties in a manner allowed and/or otherwise controlled by parties having ownership rights or interests in the data. For example, in some embodiments, a utility operator may allow access to certain limited aspects of its operational data and/or allow indirect access to its data (e.g., by allowing certain computations to be performed on the data without providing direct access to the data). In further embodiments, differential privacy methods may be used in connection with preserving the privacy and/or confidentiality of data accessible to various ecosystem participants.

BRIEF DESCRIPTION OF THE DRAWINGS

The inventive body of work will be readily understood by referring to the following detailed description in conjunction with the accompanying drawings, in which:

FIG. 2 illustrates exemplary operational datasets consistent with embodiments of the present disclosure.

DETAILED DESCRIPTION

Figure 1:
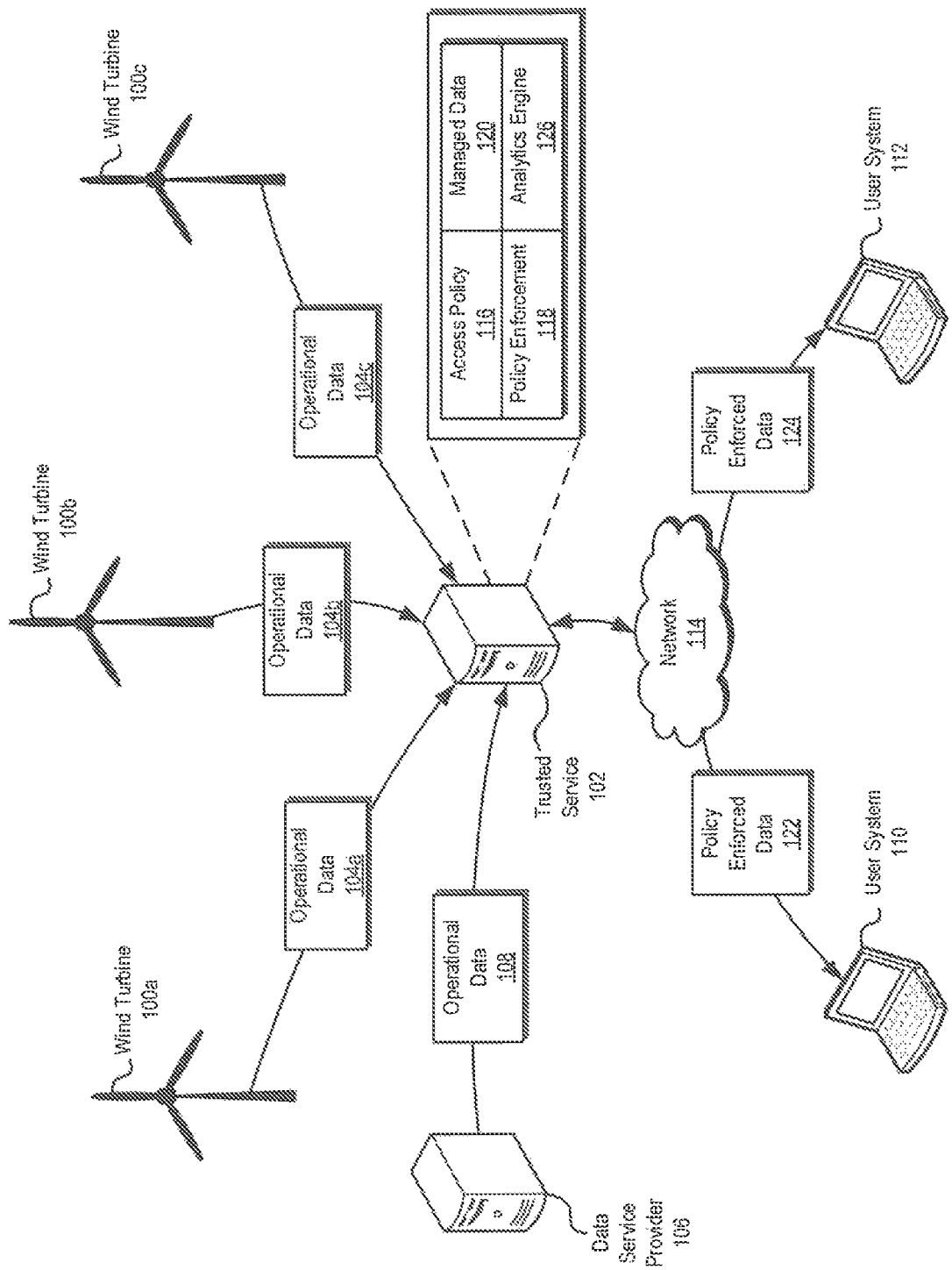
FIG. 1 illustrates generation, communication, and management of operational data consistent with embodiments of the present disclosure.

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Analyzing data associated with the generation, distribution and management of wind energy production and/or distribution (e.g., data relating to wind turbine components such as a gearbox, generator, and/or the like) is becoming increasingly important as a larger number of wind turbines are being deployed. Analyzing wind energy data can provide a variety of types of meaningful results including, without limitation, predictions relating to energy production, component failures, and/or the like that may be used to improve the management and operation of a wind farm. Among other things, such analysis may be used to increase the efficiency of wind farm operations and/or the like.

Certain analytics relating to wind energy data may be improved if a large amount of historical and/or real-time data is accessible to an associated analysis program. For example, in some embodiments, machine learning algorithms and/or statistical models may be better trained when more data is available for use in connection with the algorithm or model training. Various entities that generate and/or otherwise own data, however, may have conflicting business interests. Accordingly, even though sharing data can mutually benefit or increase the entities' business efficiencies, they may be somewhat reluctant to share data because they may not want to expose potentially sensitive information to their potential competitors.

Independent entities may further be interested in accessing, analyzing, and/or otherwise using data related to wind energy generation, distribution and management. For example, a government entity may wish to predict wind energy production from all wind farms located in a particular area (e.g., a utility area, a state, a country, etc.). Wind 5N farm operators may be willing to cooperate with such an effort, but may nevertheless be reluctant to share potentially sensitive information with the government entity.

Systems and methods are presented herein that facilitate the secure collection and management of operational data relating to a power generation system that includes one or more wind turbines. Embodiments disclosed herein may also be used to provide various insights on wind farm operation and management using collected operational data. Further embodiments facilitate policy-managed access to operational data, including policy-managed access implementing differential privacy, in a manner allowed and/or otherwise controlled by parties having ownership rights or interests in the data. In certain embodiments, differential privacy methods may be used to preserve the privacy of associated data.

Although various embodiments disclosed herein are discussed in connection with operational data associated with a power generation system that includes one or more wind turbines, it will be appreciated that further embodiments may be used in connection with any other type of suitable data associated with any other type of systems and/or entities. For example, certain embodiments of the disclosed systems and methods may be used in connection with operational data associated with a power generation system that includes solar power generation capabilities. In some embodiments, the disclosed systems and methods may be used in connection with a power generation system that includes a variety of different types of power generation capabilities. Further implementations may be used in connection with data that is not necessarily associated with the generation of electrical power.

FIG. 1 illustrates generation, communication, and storage of operational data associated with one or more wind turbine systems $100a$-$100c$ consistent with embodiments of the present disclosure. As illustrated, one or more wind turbine systems $100a$-$110c$ may be communicatively coupled with a trusted service system 102 and be configured to communicate operational data $104a$-$104c$ generated by and/or otherwise associated with the wind turbine systems $100a$-$100c$ to the trusted service 102. The trusted service 102 may further be communicatively coupled with a data service provider system 106 that may provide the trusted service 102 with additional data 108 relevant to the operation, control, and/or management of the wind turbine system(s) $100a$-$100c$. In certain embodiments, the data service provider 106 may be associated with a utility provider associated with the wind turbine system(s) $100a$-$100c$ and/or separate entity such as a third-party data service (e.g., a weather data service, a planetary information data service, etc.).

Operational data $104a$-$104c$, 108, as used herein, may comprise any data relating to the wind turbine system(s) $100a$-$100c$ and/or the maintenance, control, management, and/or operation thereof. Operational data may be used to analyze, determine, and/or predict causes of wind turbine system failures including, without limitation, failures from wear out, relaxation, high wind, grid outages, lightning, icing, control system malfunctions and/or the like. These types of exemplary failures may impact various wind turbine system components including, without limitation, electrical control units, cables and/or connections, relays, sensors, fuses, converters, drive shafts, drive train components, brake shoes and pads, generator bearings, gearbox bearings, shafts and/or other components, mechanical brakes, rotor bearings, gear wheels, and/or the like.

In certain embodiments, operational data $104a$-$104c$, 108 may include information obtained from one or more sensors associated with one or more of the wind turbine systems $100a$-$100c$ that may include, without limitation, fiber optic transducers, speed transducers, accelerometers, oil debris counters, turbine condition monitoring system ("CMS") sensors, mechanical stress and/or strain gages, digital image correlation sensors, photogrammetry sensors, stress wave sensors, inline particle count sensors, oil fill and/or other fluid level sensors, offline particle count sensors, rotor speed sensors, blade pitch sensors, atmospheric and/or environmental sensors (e.g., anemometers, wind speed and/or direction sensors, altitude sensors, temperature sensors, solar radiation sensors, sunshine duration sensors, precipitation sensors, atmospheric pressure sensors, cloud cover sensors, evaporation and/or humidity sensors, etc.).

In certain embodiments, operational data 108 may be provided by one or more data service providers 106 in communication with the trusted service 102. In some embodiments, the data service providers 106 may be associated with a utility that operates the wind turbine systems $100a$-$100c$. For example, the data service providers 106 may provide operational data relating to the wind turbine systems $100a$-$100c$ that may include a number of failures, turbine operational times, repair times, associated SCADA system data, various turbine operation, parameter, and/or control information (e.g., control board/module data, gear box data, generator data, etc.), previous time periods to order, ship, and/or stage replacement parts and/or components, utility power requirements and/or loads (e.g., historical and/or current power consumption and/or load(s), control system faults and associated fault times and/or durations, and/or the like.

In further embodiments, the data service provider 106 may provide operational data that may not necessarily be directly associated with the wind turbine system(s) 100a-100c, but may be relevant for use in connection with decisions and/or analyses relating to their operation. For example, in some embodiments, the data service provider 106 may provide historic, current, and/or forecasted environmental and/or weather data (e.g., local and/or global weather data), historic, current, and/or forecasted grid power demand data, maintenance log data, planetary information service data, and/or the like.

Operational data may be categorized in one or more datasets, examples of which are illustrated in FIG. 2. It will be appreciated that a wide variety of operational data may be used in connection with embodiments of disclosed systems and methods, and that any o suitable operational data may be used in connection with the disclosed embodiments. In some embodiments, operational data managed by the trusted service 102 may be stored and/or otherwise formatted according to a standard data model to facilitate improved interaction with various types of operational data in connection with the disclosed systems and methods.

Referring back to FIG. 1, one or more user systems 110, 112 may be communicatively coupled with the trusted service 102. The one or more user systems may be configured to interface with the trusted service 102 in connection with interacting with various operational data 104-104c, 108 managed by the trusted service 102. For example, in some embodiments, the user systems 110, 112 may request certain operational data 104-104c, 108 managed by the trusted service 102 for use in connection with various decisions and/or analyses relating to the operation of the wind turbine systems 100a-100c. As detailed below, in certain embodiments, such interactions may be managed according to one or more articulated policies enforced by the trusted service 102.

The wind turbine systems 100a-100c, trusted service system 102, data service provider systems 106, and/or the user systems 110, 112 may comprise a variety of computing devices and/or systems, including any computing system or systems suitable to implement the systems and methods disclosed herein. For example, the systems 100a-100c, 102, 106, 110, 112 may comprise a variety of computing devices and systems, including laptop computer systems, desktop computer systems, server computer systems, distributed computer systems, smartphones, tablets, and/or the like. It will be appreciated that any suitable configuration of computing systems and storage media could be used in connection with the systems including, without limitation, a single server or cluster of servers, or a distributed collection of heterogeneous computer systems connected by a variety of networks (e.g., such as the Internet, public and/or private networks, and/or the like).

In certain embodiments, the various systems 100a-100c, 102, 106, 110, 112 may comprise at least one processor system configured to execute instructions stored on an associated non-transitory computer-readable storage medium. As discussed in more detail below, the various systems may further comprise a secure processing unit ("SPU") configured to perform sensitive operations such as trusted credential and/or key management, secure policy management and/or enforcement, and/or other aspects of the systems and methods disclosed herein. The systems 100a-100c, 102, 106, 110, 112 may further comprise software and/or hardware configured to enable electronic communication of information between the devices and/or systems 100a-100c, 102, 106, 110, 112 via one or more networks (e.g., network 114) using any suitable communication technology and/or standard.

In certain embodiments, the various systems, including the trusted service 102, the data service provider 106, user systems 110, 112, and the wind turbine systems 100a-100c, may be communicatively coupled via one or more network connections (e.g., network connections of a network 114) The network connection(s) may comprise a variety of network communication devices and/or channels and may utilize any suitable communication protocols and/or standards facilitating communication between the various systems. The network connections may comprise the Internet, a local area network, a virtual private network, and/or any other communication network utilizing one or more electronic communication technologies and/or standards (e.g., Ethernet or the like). In some embodiments, the network may comprise a wireless carrier system, such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Speciale Mobile ("GSM"), frequency division multiple access ("FDMA"), and/or time divisional multiple access ("TDMA") standards. In certain embodiments, the network connections may incorporate one or more satellite communication links. In yet further embodiments, the network connections utilize IEEE's 802.11 standards, Bluetooth®, ultra-wide band ("UWB"), Zigbee®, and/or any other suitable standard or standards.

Various user systems 110, 112 may be interested in using different types of operational data 104a-104c, 108 in connection with various analytics and/or decision processes including, without limitation, anomaly detection, fault identification, trend prediction and/or projections, and/or the like. Table 1, presented below, includes exemplary analytic and/or decision processes based on operational data and relevant types of operational data.

TABLE 1

| Analysis | Purpose | Operational Data |
| --- | --- | --- |
| Deviations | Anomaly Detection | Measured parameters |
| Pattern Matching | Fault Diagnostics | Measured parameters, derived normal operational states |
| Prediction Trending | Future Behavior | Time series data analysis (Autocorrelation function data ("ACF"), Partial ACF) |
| Future Projections | Time to Failure | Time series data analysis and forecasting |

It will be appreciated that a variety of users and/or entities may be interested in using operational data in a variety of contexts. For example, an operations and/or maintenance provider responsible for maintenance scheduling for a wind turbine system 100a-100c may be interested in SCADA data from the system. An original equipment manufacturer ("OEM") seeking to optimize equipment deployed at a particular site may be interested in location specific weather information associated with the site. A grid operator planning electrical power production and/or distribution based on anticipated future load may be interested in weather forecasting data at a site associated with the wind turbine systems 100a-100c. Similarly, an equity and/or commodity trader looking for forecast global demand and/or commercial environments for energy production may be interested in global weather forecasting data.

In further embodiments, multiple types of operational data may be used to provide valuable insights relating to the operation of wind turbine systems 100a-100c. For example, in some embodiments, a maintenance provider may use weather forecasting information to merge predicted weather downtime with maintenance operations to increase the overall operation uptime of a wind turbine system 100a-100c.

As discussed above, one or more user systems 110, 112 may request certain operational data managed by the trusted service 102 for use in connection with a decision, management, operation and/or analytics processes. Consistent with embodiments disclosed herein, such interactions and/or operational data requests may be managed according to one or more articulated policies 116 enforced by the trusted service 102. For example, as illustrated, a data management and/or policy enforcement module 118 executing on the trusted service 102 may, among other things, determine whether requests to access operational data 120 managed by the trusted service 102 received from one or more user systems 110, 112 should be granted and/or the conditions of any access based on applicable associated policies 116.

Figure 3:
FIG. 3 illustrates an exemplary operational data access policy consistent with embodiments of the present disclosure.

A variety of policies 116 may enforced by the policy enforcement module 118 of the trusted service 102 in connection with managing operational data 120. In some embodiments, a policy 116 may articulate certain restrictions, conditions, requirements, and/or other actions associated with access to and/or use of operational data 120 managed by the trusted service 102. For example, in some embodiments, operational data 120 managed by the trusted service 102 may or may not be communicated to a user system 110, 112 based on an identity of a requesting user and/or a user system 110, 112 and/or the type of requested operational data. FIG. 3 illustrates an exemplary operational data access policy 300 articulating datasets 302 and associated user roles 304 that may be permitted access to the datasets 302 consistent with embodiments disclosed herein.

In further embodiments, policies 116 may specify one or more operations and/or transformations that should be performed on operational data 120 prior to providing the data to a requesting user system 110, 112. For example, as discussed in more detail below, a policy 116 may articulate that noise be added to operational data 120 prior to providing the data to a requesting user system 110, 112. In further embodiments, a policy 116 may articulate that certain information be removed from operational data 120 prior to providing the data to a requesting user system 110, 112

Policies 116 enforced by the policy enforcement module 118 may be generated by a variety of interested parties. In some embodiments, policies 116 may be created by an entity generating associated operational data 120 and/or having ownership, interests in, and/or control of such data. For example, an operator of a wind turbine 100a may specify that operational data 104a generated by the wind turbine 100a may only be shared with certain other entities or shared in a particular manner and/or for particular purposes. In another example, a regulatory authority for an entity associated with a plurality of wind turbine systems 100a-100b may articulate policies associated with the sharing of operational data 104a-104c generated by the systems 100a-100c.

In certain embodiments, policies 116 may be transmitted to the trusted service 102 concurrent with associated operational data 104a-104c, 108. For example, data service provider 106 may transmit applicable policies 116 when operational data 108 is transmitted to the trusted service 102. In further embodiments, policies 116 may be transmitted to the trusted service 102 separate from associated operational data 104a-104c, 108 at any suitable time.

In some embodiments, policies 116 may be role-based (e.g., with users having certain rights and/or permissions based on one or more defined roles), user-based (e.g., with users having certain rights and/or permissions based on their individual identities), organization-based (e.g., with users having certain rights and/or permissions based on membership in one or more organizations), based on a type of associated operational data (e.g., with access being restricted to certain operational data 120 deemed proprietary), and/or the like. Policies 116 may articulate, without limitation, policies preventing and/or otherwise restricting access to certain operational data 120, policies articulating that certain conditions be met prior to allowing access to certain operational data 120 (e.g., purchasing rights associated with the data, registration with a rights holder, demonstrating authorization to access the data, etc.), policies articulating that certain actions be performed in connection with accessing the data 120 (e.g., notifying a rights holder, etc.), and/or the like. It will be appreciated that a variety of other types of policies may be associated with allowing access to and/or use of operational data 120, and that any type of policy articulating any restrictions, conditions, requirements, and/or actions to be enforced in connection with access to and/or use of operational data 120 may be utilized in connection with the disclosed embodiments.

In some embodiments, one or more user systems 110, 112 may issue requests for certain computations and/or analytics to be performed by the trusted service 102 on operational data 120 managed by the trusted service 102. If permitted by applicable policies 116, the trusted service 102 may perform the requested computations and/or analysis and return an associated response to the requesting user systems 110, 112. In this manner, value may be derived from the operational data 120 and shared with user systems 110, 112 without transmitting the data 120 from the trusted service 102 and/or otherwise compromising the security and/or integrity of the data 120.

It will be appreciated that a number of variations can be made to the architecture and relationships presented in connection with FIG. 1 within the scope of the inventive body of work. For example, without limitation, in some embodiments, some or all of the functions performed by the wind turbine systems 100a-110c, the trusted system 102, the data service provider systems 106, and/or the user systems 110, 112 may be performed by a single system and/or any suitable combination of systems. Furthermore, in some embodiments, operational data 104a-104c may not necessarily be provided by wind turbine systems 100a-100c but some other type of monitored system or systems. Thus it will be appreciated that FIG. 1 is provided for purposes of illustration and explanation, and not limitation.

Figure 4:
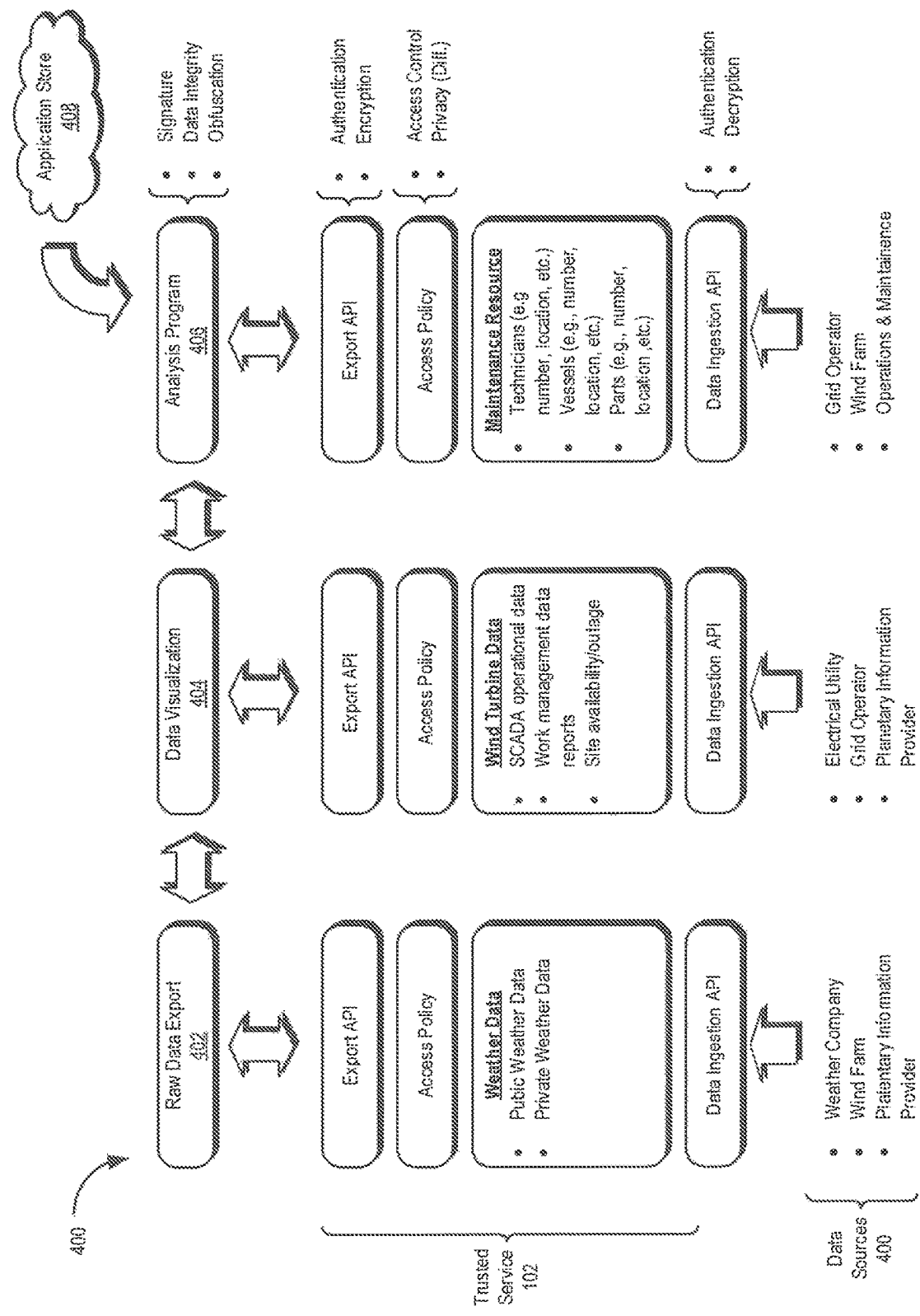
FIG. 4 illustrates an exemplary architecture for managing operational data consistent with embodiments of the present disclosure.

FIG. 4 illustrates an exemplary architecture 400 for managing operational data consistent with embodiments of the present disclosure. In certain embodiments, various aspects of the illustrated architecture may be associated with one or more sources 400 of operational data (e.g., data service providers, wind turbine systems, etc.), one or more trusted services 102, and/or one or more user systems.

As illustrated, various operational data received from one or more data sources 400 may be ingested by one or more trusted services 102 via one or more data ingestion APIs, which may comprise restful APIs. In some embodiments, the operational data may include, for example, weather data, which may comprise publicly available and/or generated weather data and/or privately generated and/or available weather data. Sources 400 of the weather data provided to the trusted services 102 may include, for example, a weather and/or forecasting entity, a wind farm, a planetary information data service provider, and/or the like.

The operational data may also include wind turbine data. The wind turbine data may include, for example, SCADA system data, work management data reports and/or resources, and information relating to wind turbine site availability and/or outages. Sources 400 of the wind turbine data provided to the trusted service 102 may include, for example, an electric utility, an electric grid operator, a planetary information data service provider, and/or the like.

The operational data may further include maintenance resource data. The maintenance resource data may include, for example, information relating to maintenance technicians, vehicles, and/or vessels and/or the number, availability, location, capabilities of the same, and/or parts information (e.g., number, availability, location etc.). Sources 400 of the maintenance resource data provided to the trusted service 102 may include, for example, an electric grid operator, a wind farm operator, operations and/or maintenance providers, parts suppliers, and/or the like.

In certain embodiments, the trusted service 102 may be authenticated by the data sources 400 prior to transmission of operational data via any suitable authentication process. In some embodiments, communicated operational data may be encrypted, and may be decrypted as part of the data ingestion process.

Ingested operational data may be managed by the trusted service according to one or more data access policies. In certain embodiments, the data access policies may be used to manage access to and/or use of the operational data and/or manage privacy in connection with the same. In some embodiments, the data access policies may allow for differential privacy management. Data access policies may restrict what operational data may be exposed by and/or otherwise exported from the trusted service 102 to one or more user systems via one or more data export APIs based on the identity, role, and/or membership of a requesting user system, a type of associated data and/or the like. Data access policies may further articulate one or more conditions for access to certain operational data, actions that may be performed using operational data, and/or conditions associated with the same.

In certain embodiments, user devices receiving operational data from the trusted service 102 may be authenticated prior to transmission of operational data via any suitable authentication process. In some embodiments, communicated operational data may be encrypted, and may be decrypted by receiving user devices.

Exported data may be used in a variety of ways. For example, raw data 402 may be exported and provided to requesting user devices if permitted by applicable policies. In certain embodiments, data visualization engines 404 may be used to generate visualizations based on exported operational data. In some embodiments, rather than exporting operational data from the trusted service 102 for generation of visualizations by a requesting user device, the trusted service 102 may generate visualizations and export them to a requesting user device. In further embodiments, operational data may be provided to an analysis program 406, which may be downloaded to a user device from an application store 408, configured to analyze and/or otherwise allow for interpretation of the exported operational data. Although illustrated as being separate from the trusted service 102, it will be appreciated that in certain embodiments, one or more elements 402-406 may be incorporated into a trusted service 102. Additionally, various signature verification, data integrity checking, and secure information obfuscation may be implemented in connection with exporting operational data.

In one example, a utility company may be provided direct unrestricted access to operational data generated by company's wind turbine systems that is managed by the trusted service 102. The company may further be provided restricted and/or otherwise privacy managed access to operational data generated by other entities. Data may be restricted and/or otherwise privacy managed using a variety of methods. For example, requested data may be provided directly to requesting user systems associated with an entity that generated the requested data. Requested data originating from a different entity, however, may be modified to add a layer of noise, processed, transformed, and/or otherwise redacted in some way (e.g., via rule-based redaction of certain fields that an entity may not wish to reveal externally), and/or the like prior to exporting to a requesting user system.

In connection with data analytics methods using operational data (e.g., methods using statistical inference and/or machine learning techniques to analyze operational data), policies may allow an entity unobfuscated access to data it has generated and obfuscated access to other sources of data by tailoring the manner in which the associated analysis algorithms are implemented. For example, a trained tuned machine-learning algorithm may be used in connection with processing operational data that includes noise and/or other obfuscations, and a more simplified algorithm may be used in connection with processing operational data that does not include noise and/or other obfuscations.

In some embodiments, noise and/or other obfuscations may not be introduced into operational data when initially presented to an analysis algorithm, but may be introduced at a later time in connection with training of the algorithm. For example, in certain embodiments, machine-learning algorithms may be initially provided with an operational dataset without noise having an associated known computational result. Based on this initial dataset, the algorithm may be tuned such that even when noise is added to the initial operational dataset, the machine-learning algorithm outputs the same and/or similar known computational result. Once tuned, the machine-learning algorithm may be used in connection with operational datasets having certain added noise and % or obfuscations to provide valuable computational results.

In one example implementing certain embodiments of the disclosed systems and methods, historical sensor operational data associated with a wind turbine system may be used in connection with training certain machine-learning analysis algorithms. For example, historical sensor operational data preceding a known fault condition may be used to train a machine-learning analysis algorithm to predict future fault conditions based on received operational data.

In another example implementing certain embodiments of the disclosed systems and methods, the performance of a wind turbine system may be monitored. Measured parameters included in relevant operational data may be classified into one or more datasets (e.g., wind parameters—speed, deviation; performance parameters—power output, rotor speed, blade pitch angle; vibration parameters—tower acceleration, drivetrain acceleration; and temperature parameters—bearing, gearbox temperature). Relevant operational data may further include certain operational condition and/or control system status information (e.g., status codes—error, warning; operating states—brake, start, yaw, pitch, etc.). Based on available operational data, different groups of parameters (e.g., power and wind) may be correlated, models may be developed for normal operational states, and such models may be used to identify abnormal scenarios. Statistical analysis relating to events experienced by wind turbine systems may further be performed based on the available operational data.

In some embodiments, operational data privacy may be managed in a variety of ways. For example, in some embodiments, data may be isolated into different storage buckets associated with various entities having ownership rights in the data, data access may require possession of certain access keys, data may be stored in a binary format, analytic results may be stored into storage buckets associated with entities having ownership rights in the underlying data, and/or the like. Data may further be protected during transmission between systems using authentication, encryption, and/or data obfuscation techniques.

It will be appreciated that a number of variations can be made to the architecture and relationships presented in connection with FIG. 4 within the scope of the inventive body of work. For example, without limitation, in some embodiments, some or all of the functions performed by the trusted service 102, data sources 400, and/or user systems may be performed by a single system and/or any suitable combination of systems. Similarly, although various elements are illustrated in connection with a single trusted service 102, it will be appreciated that in further embodiments, various elements may be included in multiple trusted services 102. Thus it will be appreciated that FIG. 1 is provided for purposes of illustration and explanation, and not limitation.

Figure 5:
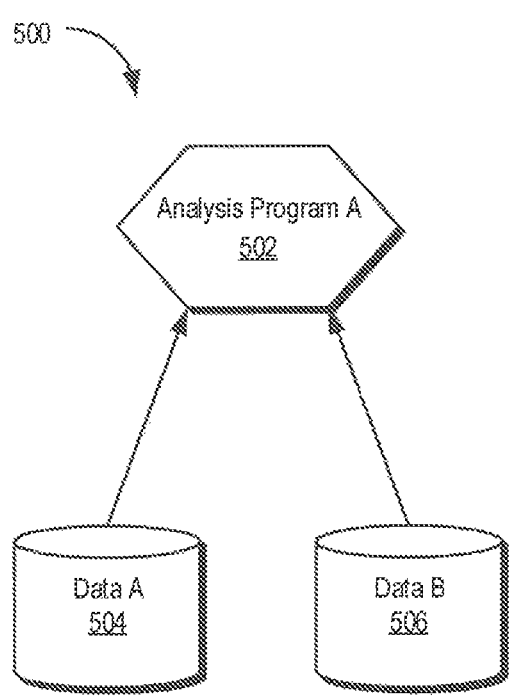
FIG. 5 illustrates a conceptual diagram relating to the use of operational data consistent with embodiments of the present disclosure.

FIG. 5 illustrates a conceptual diagram 500 relating to the use of various operational data consistent with embodiments of the present disclosure. As illustrated, different entities—entities A and B—may generate and/or otherwise own or have certain enforceable interests in different operational datasets—dataset A 504 and dataset B 506 respectively. An analysis program 502 generated and/or operated by entity A may wish to use information in both dataset A 504 and dataset B 506 to improve its analytical results. Entity B, however, may not wish to allow such access because the analysis program may expose potentially sensitive information in dataset B 504 to entity A. For example, entities A and B may both operate wind farms, and thus may have conflicting and/or otherwise competing business interests. Sharing operational data, however, may mutually benefit or increase their business efficiencies, but they may be reluctant to share data because they may not want to expose potentially sensitive information to their potential competitors.

Consistent with embodiments disclosed herein, differential privacy methods may be used to alleviate some of the aforementioned concerns between various entities and to encourage sharing of data. In certain embodiments, implementing differential privacy may be achieved by generating and adding noise to a subject dataset in order to obfuscate certain details in the dataset without distributing the ability to detect desired macro-level patterns in the data.

In some embodiments, the noise may be generated based on one or more pre-specified distributions. For example, when data reflects the temperature of a gearbox of a particular wind turbine at a specific location and point in time, added noise may change the temperature values such that an analysis program may not determine the exact location of the associated wind turbine. When processing aggregations or strings of data within a certain time period and region, noise may be added across the dataset at a level so that it stays within the threshold of intrinsic noise levels in the system. In this manner, aggregations or strings of data can be used to deliver the same result at a macro level as aggregations or strings of data without noise.

A variety of distributions may be used in connection with generating noise consistent with the disclosed embodiments. For example, distributions used in connection with generating noise may comprise one or more of Laplacian distributions, Gaussian distributions, and/or any other exponential family distributions suited to underlying data's statistical moments and format.

In some embodiments, noise may be added in a manner such that the net amount of any noise added to an operational dataset is relatively small or zero. For example, when any positive noise is added to an operational dataset, an equal or a similar amount of negative noise may be added to the operational dataset such that the net amount of added noise is relatively small or zero. In some embodiments, the amount and/or character of added noise may be based, at least in part, on the underlying dataset information.

Figure 6:
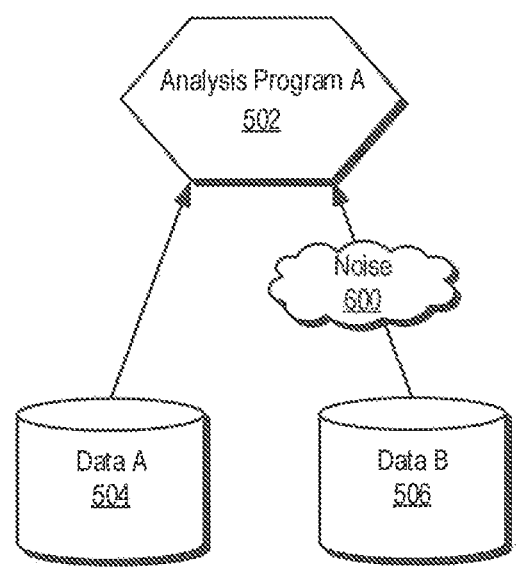
FIG. 6 illustrates an example of differential privacy management consistent with embodiments of the present disclosure.

FIG. 6 illustrates an example of differential privacy management consistent with embodiments of the present disclosure. As illustrated, different entities—entities A and B—may generate and/or otherwise own different datasets—dataset A 504 and dataset B 506 respectively. An analysis program 502 generated and/or operated by entity A may wish to use information in both dataset A 504 and dataset B 506 to improve its analytical results. Entity B, however, may not wish to allow such access because the analysis program 502 may expose potentially sensitive information in dataset B 506 to entity A. To alleviate these concerns, noise 600 may be added to dataset B 506 prior to access by the analysis program 502 associated with entity A. For example, noise 600 may be added to dataset B 506 by an associated trusted service prior to export of dataset B 506 to a user system and/or access to dataset B by the analysis program 502.

In some embodiments, the noise 600 may obfuscate values included in dataset B 506 at a micro-level, but may still enable the same quality of analysis by the program 502. That is, a result generated by the analysis program 502 may be the same and/or similar quality as the result would be if noise 600 was not added.

Figure 7:
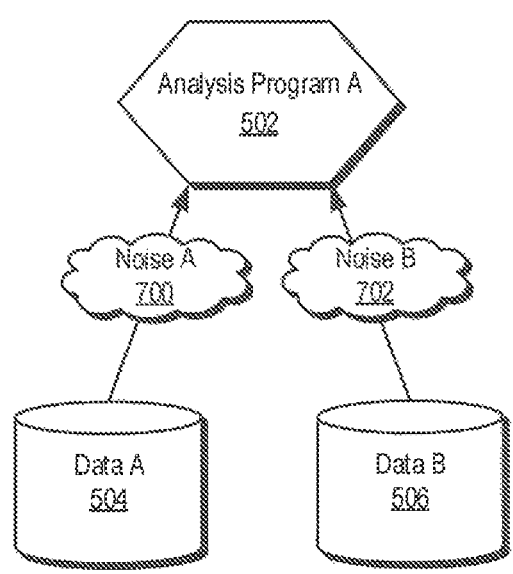
FIG. 7 illustrates another example of differential privacy management consistent with embodiments of the present disclosure.

FIG. 7 illustrates another example of differential privacy management consistent with embodiments of the present disclosure. In some embodiments, when applying noise to a single dataset, an algorithm used by an analysis program 502 may require tuning to account for the noise to generate the same and/or similar quality of analysis result. Since the tuned algorithm may also be applied to other analyzed datasets, including datasets without any noise, noise may also be added to the other datasets allowing for more simplified analysis algorithms. For example, as illustrated, noise 700, 702 may be added to both datasets A 504 and B 506 prior to being accessed by and/or operated on by the analysis program 502, allowing a same algorithm to be used by the analysis program 502 in connection with the analyzing the different datasets 504, 506.

In some embodiments, the noise 700 added to dataset A 504 may be the same as the noise 702 added to dataset B 506. In further embodiments, the noise 700 added to dataset A 504 may be different than the noise 702 added to dataset B 506.

Figure 8:
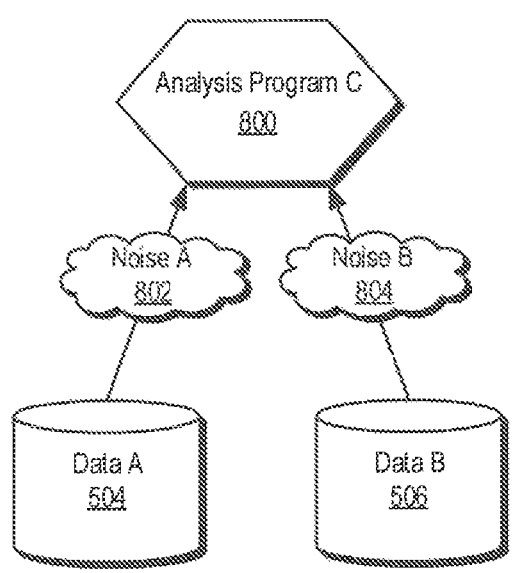
FIG. 8 illustrates a further example of differential privacy management consistent with embodiments of the present disclosure.

FIG. 8 illustrates a further example of differential privacy management consistent with embodiments of the present disclosure. In some embodiments, an independent entity—entity C—may wish to analyze data associated with other entities—datasets A 504 and B 506—using an associated analysis program 800. Noise 802, 804 may be applied to the datasets at level(s) reflecting that entity C is independent from the entities that generated and/or otherwise own datasets A 504 and B 506. For example, increased noise 802, 804 may be added to the datasets prior to access by the analysis program 800 than would be added if the analysis program 800 was not associated with an independent entity and/or was associated with an entity having more permissive rights in the associated datasets 504, 506.

In one example, entity C may not be closely related with entity A and entity B, and thus additional noise 802, 804 may be added to the datasets A 504 and B 506 than what would be added if entity C were more closely related. In another example, entity C may be closely related with entity A and not closely related with entity B. Accordingly, reflective of this relationship, more noise 802 may be added to dataset A 504 than that added to dataset B 506. Added noise levels may be pre-determined based on specified business requirements, may be tuned based on detection of proprietary information from associated data streams, and/or may be determined to remain within the bounds of pre-existing levels of noise fluctuations intrinsic to the dataset.

Noise levels may be determined in a variety of ways and may be based on a variety of factors including, for example, the identity of an owner of an analysis program and/or the relationship between the analysis program's owner and associated dataset owners. In some embodiments, an analysis program may be signed by an owner's private/secret key in a manner allowing a system that controls a level and/or amount of added dataset noise to authenticate the identity of the analysis program's owner by verifying the digital signature. In further embodiments, if a trusted intermediary is authorized by the various entities to manage identities, the trusted intermediary may sign the analysis program in a manner that indicates the analysis program's owner.

In certain embodiments, a relation table may be securely maintained in connection with determining an amount and/or level of noise to add to a particular dataset. An exemplary relation table is provided below in Table 2:

TABLE 2

Dataset Noise Relation Table

| | Dataset A | Dataset B |
| --- | --- | --- |
| Entity A | Noise-A | Noise-B |
| Entity B | Noise-A | Noise-B |
| Entity C | Noise-A' | Noise-B' |
| Entity D | Noise-A' | Data-B is not accessible for D |

The columns of the exemplary dataset noise relation Table 2 are associated with an entity associated with an analysis program—entities A and B—and the rows are associated with an entity associated with and/or otherwise owning a dataset—entities A, B, C and D. The type and/or level of noise may be added to a dataset based on the noise level indicated in the relation table. For example, when the identity of an owner of an analysis program 800 is verified as entity C, noise level Noise-A' 802 may be applied to dataset A 504 and noise level Noise B' 804 may be applied to dataset B 506.

The content of the table may be updated independently from the execution of the analysis program. In some embodiments, the table may be updated by an entity having a verified signature associated with a trusted intermediary who is authorized to manage the relation table between the various entities. Updating of the table may be dependent upon successful signature verification by the trusted intermediary. In some embodiments, the various indicated noise levels and/or parameters may be locally maintained by a system executing the analysis program and/or may be securely distributed with the relation table. In certain embodiments, when noise levels and/or parameters are distributed together with the relation table, the indicated levels and/or parameters may be digitally signed together with the table by the trusted intermediary.

Figure 9:
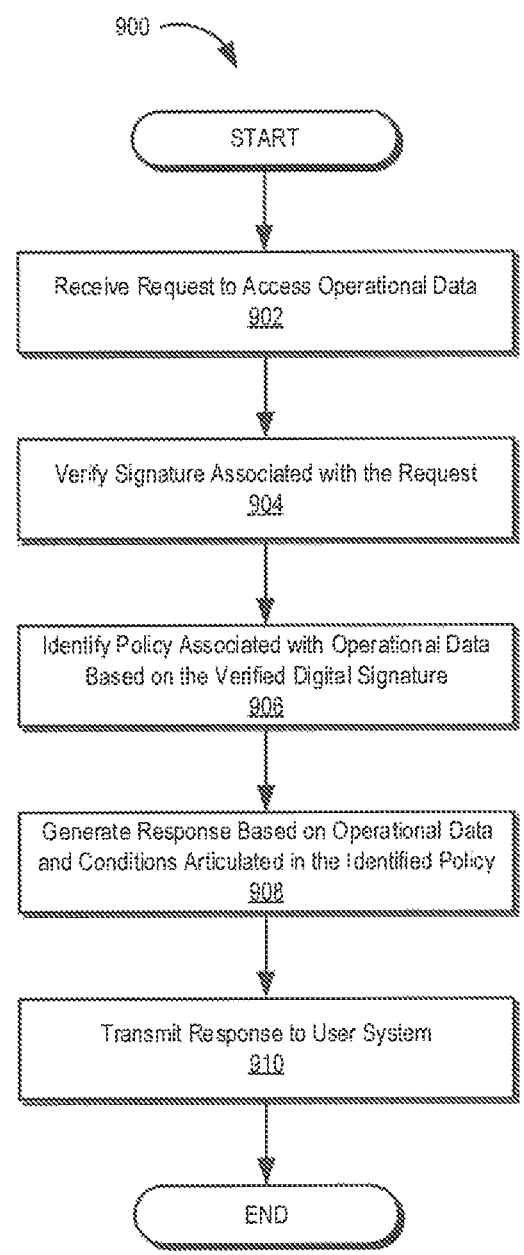
FIG. 9 illustrates an exemplary method of managing access to operational data consistent with embodiments of the present disclosure.

FIG. 9 illustrates an exemplary method 900 of managing access to operational data consistent with embodiments of the present disclosure. The illustrated method 900 may be implemented in a variety of ways, including using software, firmware, hardware, and/or any combination thereof. In certain embodiments, the method 900 may be implemented by a trusted service managing operational data associated with one or more wind turbine systems.

At 902, a request may be received from a user system to access a first set of operational data managed by the trusted service. In some embodiments, the operational data may comprise at least one of data obtained from one or more sensors associated with the one or more wind turbines, supervisory control and data acquisition data, current weather data, forecasted weather data, and current operational condition data of the one or more wind turbines.

In certain embodiments, the request may comprise a digital signature. An identity associated with the digital signature may be identified at 904. In some embodiments, the digital signature may comprise a signature of an entity associated with the user system, and the identity may comprise a verified identity of the entity. In further embodiments, the request may be generated from an analysis program executing on the user system and the digital signature may comprise a signature associated with the analysis program.

At 906 a first policy securely associated with the first set of operational data may be identified. In certain embodiments, the first policy may be stored and/or otherwise managed by the trusted service. The first policy may articulate at least one first condition for accessing the first set of operational data. In some embodiments, the at least one first condition may be based, at least in part, on the identity verified at 904.

A response to the request may be generated at 908 based on the first set of operational data and the identified first policy. In some embodiments, generating the response may comprise enforcing the at least one first condition for accessing the first set of operational data. In certain embodiments, the at least one first condition may comprise applying a first transformation to the first set of operational data and generating the response to the request may comprise transforming the first set of operational data in accordance with the first transformation of the least one first condition.

The first transformation may be based, at least in part, on information included in the received request. In this manner, the first transformation may be deterministic and/or unique based on the received request. In some embodiments, the first transformation may comprise adding a first level of noise to the first set of operational data that, in some embodiments, may be based on the verified identity.

In some embodiments, the request received from the user system may further comprise a request to access a second set of operational data managed by the trusted service. A second policy securely associated with the second set of operational data may be identified that articulates at least one second condition for accessing the second set of operational data. In some embodiments, the least one second condition may be based, at least in part, on the identity verified at 904.

The response to the request generated at 908 may be further based on the second set of operational data and the identified second policy. For example, generating the response may further include enforcing the at least one second condition for accessing the second set of operational data. In certain embodiments, the at least one second condition may comprise applying a second transformation to the second set of operational data and generating the response to the request may comprise transforming the second set of operational data in accordance with the second transformation of the least one second condition.

The second transformation may be based, at least in part, on information included in the received request. In this manner, the second transformation may be deterministic and/or unique based on the received request. In certain embodiments, the first transformation may comprise adding a first level of noise to the first set of operational data and the second transformation may comprise adding a second level of noise to the second set of operational data. The second level of noise may be based on the identity verified at 904. In some embodiments, the first level of noise and the second level of noise may comprise different levels of noise.

At 910, the response generated at 908 may be transmitted to the user system.

Figure 10:
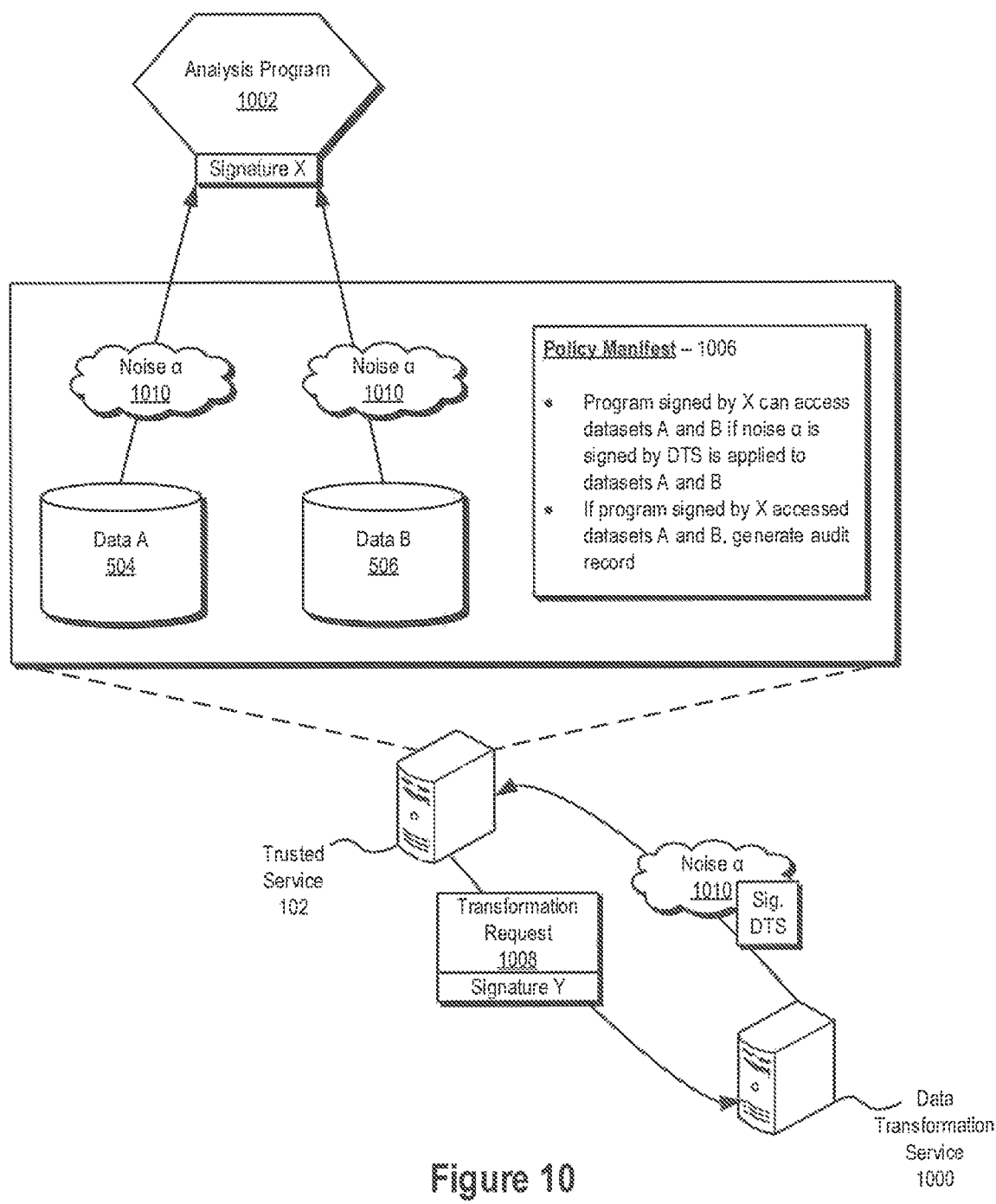
FIG. 10 illustrates an example of privacy management consistent with embodiments of the present disclosure.

FIG. 10 illustrates an example of privacy management consistent with embodiments of the present disclosure. In some embodiments, a trusted service 102 may manage operational datasets associated with different entities A and B—dataset A 504 and dataset B 506 respectively. An analysis program 1002, which may be executed by a separate user system (not shown) and/or by the trusted service 102, may request access to operational data included in datasets A and B 504, 506. In some embodiments, the analysis program 1002 and/or requests issued by the analysis program 1002 to the trusted service 102 for access to operational data included in the datasets A and B 504, 506 may be securely signed by an electronic signature X.

Consistent with embodiments disclosed herein, interactions with operational datasets 504, 506 and/or requests to interact with the same may be managed according to one or more articulated policies enforced by the trusted service 102. In some embodiments, a policy may be embodied as part of a policy manifest 1006 articulating one or more rules and/or conditions for accessing and/or otherwise interacting with the operational datasets 504, 506.

In certain embodiments, the policy manifest 1006 may articulate that certain transformations should be applied to managed operational datasets 504, 506, prior to allowing the analysis program 1002 access to the datasets 504, 506. For example, the policy manifest 1006 may articulate that noise and/or other obfuscations should be applied to the operational datasets 504, 506 prior to allowing access to the datasets 504, 506 by the analysis program 1002.

In some embodiments, a transformation specified by the policy manifest 1006 may use transformation information provided and/or otherwise generated by a data transformation service 1000 that may be separate from the trusted service 102. For example, the data transformation service 1000 may be associated with an operational data analytics service provider, and may generate tailored information for use in connection with transforming operational data 504, 506.

The trusted service 102 may issue one or more transformation information requests 1008 to the data transformation service 1000 in connection with enforcing policy articulated by the policy manifest 1006. In some embodiments, the transformation information request 1008 may be securely electronically signed by the trusted service 102 (e.g., signed by electronic signature Y). Upon receipt of the signed request 1008, the data transformation service 1000 may generate noise 1010, denoted as noise a in FIG. 10. In some embodiments, generation of the noise 1010 by the data transformation service 1000 may be contingent upon a successful verification of a signature associated with the transformation request 1008.

The generated noise 1010 may be signed by the data transformation service 1000 (e.g., signed by electronic signature DTS), and communicated to the trusted service 102 for use in connection with policy enforcement. In the illustrated example, the policy manifest 1006 enforced by the trusted service 102 may articulate that a program signed by X may access datasets A and B 504, 506 if noise a signed by DTS is first applied to the datasets A and B 504, 506. Accordingly, as part of the policy enforcement process implemented in connection with allowing the analysis program 1002 access to the datasets A and B 504, 506, the trusted service 102 may verify the signature associated with the analysis program 1002 and/or associated access requests, request signed noise 1010 from the data transformation service, verify the signature associated with the noise 1010 and/or the contents thereof, and apply the noise 1010 to the datasets A and B 504, 506.

In some embodiments, the policy embodied by the policy manifest 1006 may further articulate one or more requirements for auditing and/or otherwise recording various interactions with managed datasets 504, 506. For example, the policy manifest 1006 may articulate that if a program signed by X accesses datasets A and B 504, 506, such access much be recorded, relevant rightsholders to datasets A and B 504, 506 should be notified, and/or the like.

Figure 11:
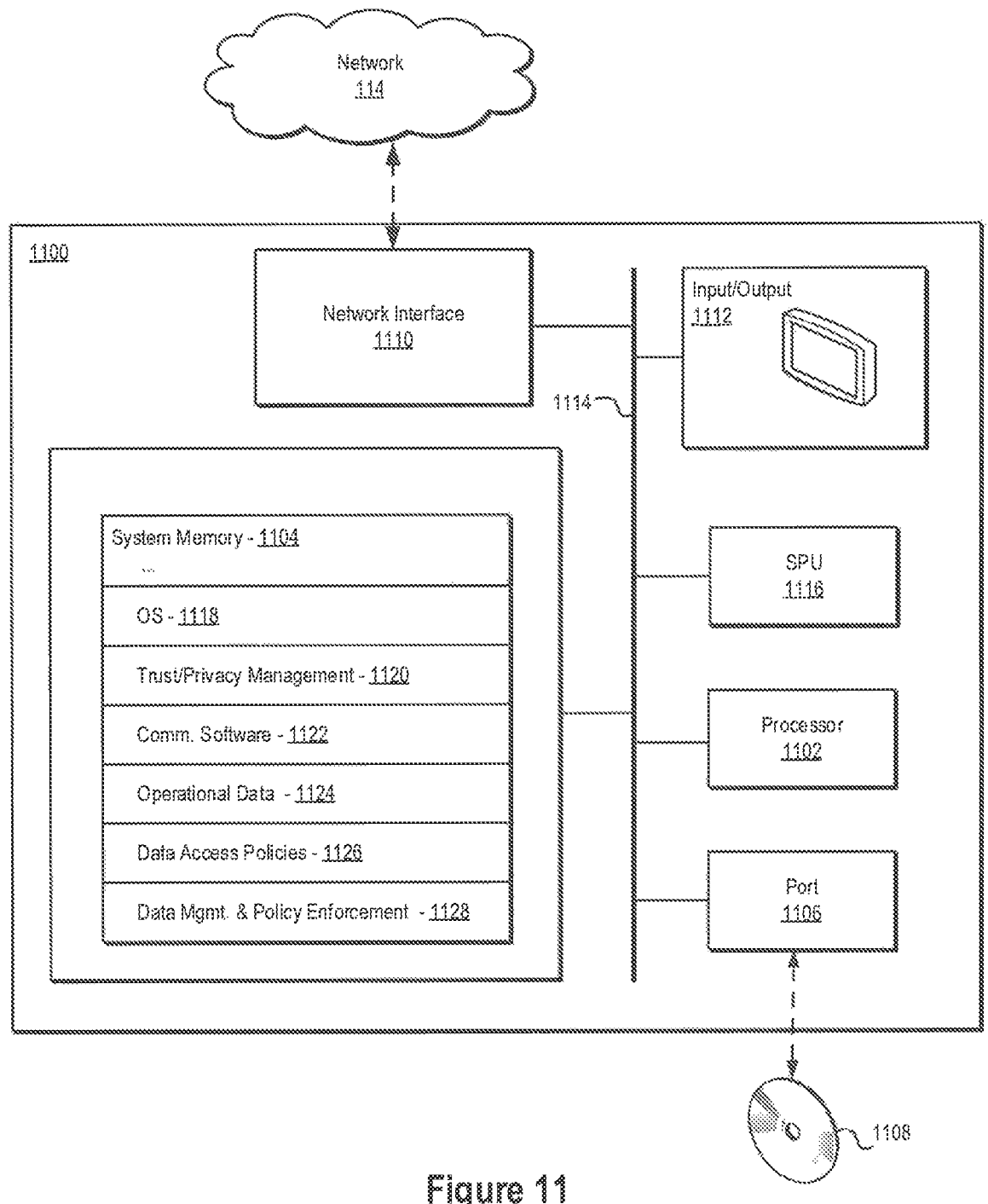
FIG. 11 illustrates an exemplary system that may be used to implement embodiments of the systems and methods of the present disclosure.

FIG. 11 illustrates an exemplary system 1100 that may be used to implement embodiments of the systems and methods of the present disclosure. Certain elements associated with the illustrated exemplary system 1100 may be included in one or more systems configured to store, communicate, and/or otherwise use operational data, and/or any other system configured to implement embodiments of the disclosed systems and methods.

As illustrated in FIG. 11, the system 1100 may include: a processing unit 1102; system memory 1104, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit; a port 1106 for interfacing with removable memory 1108 that may include one or more diskettes, optical storage mediums, and/or other non-transitory computer-readable storage mediums (e.g., flash memory, thumb drives, USB dongles, compact discs, DVDs, etc.); a network interface 1110 for communicating with other systems via one or more network connections using one or more communication technologies; a user interface 1112 that may include a display and/or one or more input/output devices such as, for example, a touchscreen, a keyboard, a mouse, a track pad, and the like; and one or more busses 1114 for communicatively coupling the elements of the system 1100.

In some embodiments, the system 1100 may, alternatively or in addition, include an SPU 1116 that is protected from tampering by a user of the system or other entities by utilizing secure physical and/or virtual security techniques. An SPU 1116 can help enhance the security of sensitive operations such as personal information management, trusted credential and/or key management, privacy and policy management, versioning control and/or management, and other aspects of the systems and methods disclosed herein. In certain embodiments, the SPU 1116 may operate in a logically secure processing domain and be configured to protect and operate on secret information, as described herein. In some embodiments, the SPU 1116 may include internal memory storing executable instructions or programs configured to enable the SPU 1116 to perform secure operations, as described herein.

The operation of the system 1100 may be generally controlled by a processing unit 1102 and/or an SPU 1116 operating by executing software instructions and programs stored in the system memory 1104 (and/or other computer-readable media, such as removable memory 1108). The system memory 1104 may store a variety of executable programs or modules for controlling the operation of the system 1100. For example, the system memory 1104 may include an operating system ("OS") 1118 that may manage and coordinate, at least in part, system hardware resources and provide for common services for execution of various applications and a trust and privacy management system 1120 for implementing trust and privacy management functionality including protection and/or management of personal data through management and/or enforcement of associated policies. The system memory 1104 may further include, without limitation, communication software 1122 configured to enable in part communication with and by the system; one or more applications; operational data 1124 and/or related access policies 1126; and/or data management and/or policy enforcement modules 1128 configured to implement various data access control methods disclosed herein; and/or any other information, modules, and/or applications configured to implement embodiments of the systems and methods disclosed herein.

The systems and methods disclosed herein are not inherently related to any particular computer, device, service, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, an optical storage medium, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method for managing operational data associated with power generation equipment performed by a trusted service system comprising a processor and a non-transitory computer-readable medium storing instructions that, when executed by the processor, cause the trusted service system to perform the method, the method comprising:
receiving, from a data analysis program, a request to access a set of operational data, the request comprising a first digital signature;
identifying a policy associated with the set of operational data, the policy articulating at least one first condition for accessing the set of operational data, the at least one first condition being associated with the first digital signature, the at least one first condition comprising applying a transformation to the set of operational data using information provided by a data transformation service;
generating based, at least in part, on the at least one first condition articulated by the policy, a transformation information request;
transmitting the transformation information request to the data transformation service;
receiving, in response to the transformation information request, transformation information from the data transformation service;
generating a response to the request to access the set of operational data based, at least in part, on the policy and the transformation information received from the data transformation service; and
transmitting the response to the data analysis program.

2. The method of claim 1, wherein the policy is securely associated with the set of operational data.

3. The method of claim 1, wherein identifying the policy comprises identifying the policy in a policy manifest securely associated with the set of operational data.

4. The method of claim 1, wherein the data analysis program is executed on the trusted service.

5. The method of claim 1, wherein the data analysis program is executed on a user system separate from the trusted service system.

6. The method of claim 1, wherein the set of operational data comprises operational data associated with one or more wind turbine systems.

7. The method of claim 1, wherein the set of operational data comprises operational data associated with one or more solar power generation systems.

8. The method of claim 1, wherein generating the response to the request to access the set of operational data comprises:
applying the transformation to the set of operational data using the transformation information received from the data transformation service.

9. The method of claim 8, wherein the transformation comprises adding noise to the set of operational data.

10. The method of claim 9, wherein the transformation information received from the data transformation service comprises noise information.

11. The method of claim 1, wherein the transformation information request comprises a second digital signature associated with the trusted service system.

12. The method of claim 1, wherein the transformation information received from the data transformation service further comprises a third digital signature associated with the data transformation service.

13. The method of claim 12, wherein the at least one first condition comprises applying a transformation to the set of operational data using information that comprises the third digital signature.

14. The method of claim 13, wherein generating the response to the request to access the set of operational data comprises verifying the third digital signature.

15. The method of claim 1, wherein the policy further articulates at least one second condition for accessing the set of operational data, the at least one second condition comprising recording audited access information relating to access to the set of operational data.

16. The method of claim 1, wherein the method further comprises generating, in response to transmitting the response to data analysis program, audited access information relating to the access to the set of operational data by the data analysis program.

17. The method of claim 16, wherein the method further comprises transmitting the audited access information to an auditing system.

18. The method of claim 1, wherein the method further comprises verifying the first digital signature.

* * * * *